United States Patent
De Groot et al.

(10) Patent No.: US 8,384,810 B2
(45) Date of Patent: Feb. 26, 2013

(54) IMAGE SENSOR ARRAY, AN INTENSIFIED IMAGE SENSOR ARRAY, AN ELECTRON BOMBARDED IMAGE SENSOR ARRAY DEVICE AS WELL AS A PIXEL SENSOR ELEMENT FOR USE IN SUCH AN IMAGE SENSOR ARRAY

(75) Inventors: Arjan Willem De Groot, Groningen (NL); Albert Jan Hof, Peize (NL)

(73) Assignee: Photonis Netherlands B.V., Roden (NL)

( * ) Notice: Subject to any disclaimer, the term of this patent is extended or adjusted under 35 U.S.C. 154(b) by 133 days.

(21) Appl. No.: 12/809,763

(22) PCT Filed: Dec. 21, 2007

(86) PCT No.: PCT/NL2007/000330
§ 371 (c)(1),
(2), (4) Date: Sep. 8, 2010

(87) PCT Pub. No.: WO2009/082193
PCT Pub. Date: Jul. 2, 2009

(65) Prior Publication Data
US 2010/0328501 A1 Dec. 30, 2010

(51) Int. Cl.
*H04N 5/335* (2011.01)
(52) U.S. Cl. .................................................. 348/294
(58) Field of Classification Search ............ 348/294
See application file for complete search history.

(56) References Cited

U.S. PATENT DOCUMENTS

| | | | |
|---|---|---|---|
| 6,657,178 B2 * | 12/2003 | Aebi | 250/214 VT |
| 7,534,984 B2 * | 5/2009 | Gleckler | 250/208.1 |
| 2002/0000508 A1 | 1/2002 | Muramatsu | |
| 2005/0269482 A1 | 12/2005 | Hopper | |
| 2006/0181625 A1 | 8/2006 | Han | |
| 2010/0302282 A1 * | 12/2010 | Dobbie et al. | 345/666 |

FOREIGN PATENT DOCUMENTS

| | | |
|---|---|---|
| EP | 1868377 A1 | 12/2007 |
| WO | WO-00/52926 | 9/2000 |
| WO | WO-01/10110 A2 | 2/2001 |

* cited by examiner

*Primary Examiner* — James Hannett
(74) *Attorney, Agent, or Firm* — Muncy, Geissler, Olds & Lowe, PLLC

(57) ABSTRACT

The invention relates to an image sensor array having multiple pixel sensor elements along the surface area of said image sensor and outputting at a specified video frame rate subsequent video frames corresponding to the image, characterized in that each multiple pixel sensor element is arranged for generating one or more video frame segments, said segments each having a time duration being a fraction of the time equivalent to the video frame rate, and composing a single video frame from the multiple of said video frame segments. The invention also relates to said pixel sensor element for use with an image intensifier or in an electron bombarded image sensor array device according to the invention.

19 Claims, 2 Drawing Sheets

(state of the art)

Figure 1:
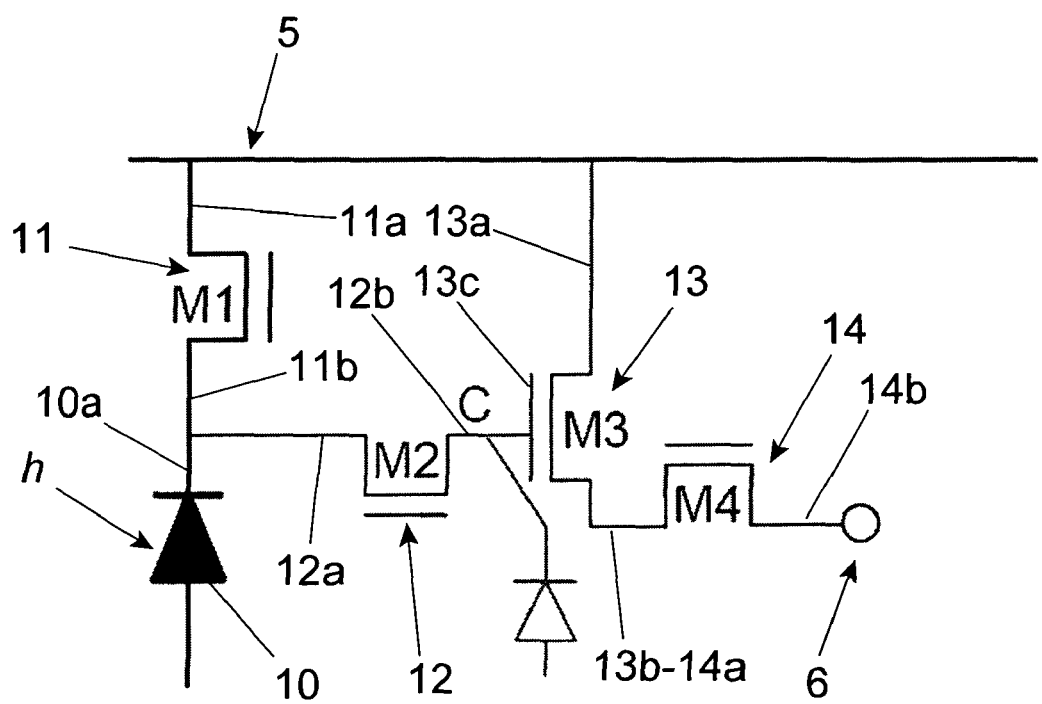

IMAGE SENSOR ARRAY, AN INTENSIFIED IMAGE SENSOR ARRAY, AN ELECTRON BOMBARDED IMAGE SENSOR ARRAY DEVICE AS WELL AS A PIXEL SENSOR ELEMENT FOR USE IN SUCH AN IMAGE SENSOR ARRAY

The invention relates to a solid state imaging device, more particularly an image sensor array having multiple pixel sensor elements along the surface area of said image sensor, which multiple pixel sensor elements are arranged in building up and outputting at a specified video frame rate from subsequent video frame time segments, each segment corresponding to time dependent information in photons arriving from the scene and imaged onto the image sensor array that enables imaging of events that have timing characteristics much faster than video frame rates.

The invention also relates to a combination of an image intensifier and aforementioned solid state image sensor array.

The invention also relates to an electron bombarded image sensor array device comprising a vacuum chamber having a photocathode capable of releasing electrons into said vacuum chamber when exposed to light impinging from an image on said photocathode, electric field means for accelerating said released electrons from said photocathode towards aforementioned image sensor array spaced apart from said photocathode in a facing relationship to receive an electron image from said photocathode, such that during use said accelerated electrons impinging on said anode each create multiple electrons in said image sensor array.

The invention also relates to a pixel sensor element for use in an image sensor array according to the invention, said pixel sensor element comprising either a light sensitive element capable of generating and outputting an electric signal in dependence of light impinging on said light sensitive element or a charge collecting element capable of collecting charges generated within the boundaries of the pixel sensor element; and six transistors and a storage element enabling the generation of video images from a multiple of image frame segments.

According to the state of the art image sensor arrays based on CCD or CMOS technology have become the main source of digital images, either for single frames (photos) or for multiple frame sequences (video). In all these applications, the image information is built up as an array of pixel grey scale values (in case of black and white but colour information is expressed similarly) proportional to the total amount of light intensity that has illuminated the image sensor array during one frame exposure time. Any information of a time dependent event or intensity variation that occurs within one frame exposure time is lost due to the accumulation characteristic of these image sensor arrays.

However, in applications where information in an image is contained not only in the spatial intensity distribution but also in the arrival time of photons, the ability to use a fast electronic shutter is of great importance. In such applications, like for example laser range gated imaging (LIDAR) or for example Fluorescence Lifetime Imaging of molecular samples, the arrival time of photons in the image relative to the timing of a pulsed excitation source is determined by the speed of light in the atmosphere for LIDAR and by decay times of molecular processes for FLI. This implies that to record such phenomena, shutter times on the order of tens of nanoseconds are required.

For such applications, the conventional technology consists of fast electronic shutters made by means of the so-called gating of the operating voltage of photocathodes in image intensifiers of which the output is optically coupled to the electronic image sensor (either CCD or CMOS based). Using this technology, the electronic image sensor can operate at normal video frame rates (i.e. typically 20-30 frames per second but sometimes even faster) while integrating multiple gated images (made by means of shutter times as short as 5 nanosecond or less from the image intensifier) into a single image frame (photo or video sequence).

By integrating the intensity of multiple gated images (that individually have extremely short duration) within one frame exposure, the signal to noise ratio is strongly improved. In these applications, the photon amplification characteristic of the image intensifier also offers signal enhancement in case only a small amount of signal photons is available in the short time slot of the gating pulse.

Another essential characteristic of the use of an image intensifier in gated digital imaging applications is that when it is gated OFF, no light from the scene or event is transmitted to the electronic image sensor. This allows for the use of highly intense excitation pulses that illuminate the scene of interest at a certain distance through backscattering media (e.g. dust, rain or fog in case of LIDAR) or induce low intensity fluorescence images (FLI) after a certain decay time.

The extinction ratio of image intensifiers for direct light transmission is estimated to be about eight decades and is due to the light absorption in the photocathode, the use of a micro-channel plate with narrow channels at a bias angle and a light tight aluminium layer covering the phosphor output screen.

Although the use of image intensifiers for gated imaging is well known and appreciated in many applications, there are certain drawbacks. As it is an extra stage in the imaging chain, it inevitably adds spatial and temporal noise and reduces the MTF. Moreover, to operate as an electronic shutter, it requires the fast switching of cathode voltages of several hundred volts (depending on the type of image intensifier) which is not trivial and lastly, such gated image intensifiers add considerable cost to an electronic image sensor.

The present invention is a new solution for the above-identified problem and to this end said multiple pixel sensor elements are arranged for generating one or more video frame segments, said segments each having a time duration being a fraction of the time equivalent to the video frame rate, and composing a single video frame from the multiple of said video frame segments.

The multiple video frame segments are obtained by switching the pixel sensor elements on and off multiple times within one video frame period. Hence within one video frame period multiple video frame segments are generated, each containing a small video signal package, which contribute to the overall video frame image information. The multiple video frame segments obtained with each pixel sensor element are accumulated and used for composing a complete single video frame signal before the actual read-out.

The above leads to a considerable improvement of the signal to noise ratio. Most essentially, the pixel sensor elements according to the invention will not accumulate any unwanted parasitic image signal information, as the pixel sensor element is switched on and off multiple times. Hence, said unwanted parasitic image signal information is not processed and does not contribute to the overall video frame signal.

According to a further aspect of said image sensor array according to the invention said time duration of said video frame segments is determined by an external control signal that is applied to all or part of the pixel sensor elements of said image sensor array.

Herewith a controllable timing of the pixel sensor elements is obtained resulting in a series of on/off switching states of the pixel sensor elements resulting in multiple video frame segments within one video frame period, each segment containing a desired small video signal package with a reduced undesired background or noise signal.

More in particular said control signal is applied to the image sensor array in synchronisation with an external event that is imaged onto said image sensor array.

According to a further embodiment of the image sensor array according to the invention said external event having characteristic image information contained in a time duration that is a fraction of the video frame rate of said image sensor array.

Moreover in another functional embodiment according to the invention said image sensor array is coupled using optical means to an output face of a image intensifier device for amplifying an external event being imaged onto said image sensor array.

The pixel sensor element according to the invention is further characterized in that it is built up with six transistors and a light sensitive element and a charge storage element. The first transistor has a first contact node connected to the supply voltage and a second contact node connected to the contact node of the light sensitive element and the third transistor has a gate node connected to the contact node of the light sensitive element, a first contact node operatively connected to the supply voltage and a second contact node operatively connected to the first contact node of the second transistor, and wherein the pixel sensor element further comprises at least one storage element having a first contact node operatively connected to the second first contact node of the second transistor element and the first contact node of the fourth transistor element.

The pixel sensor element according to the invention is further characterized in that the pixel sensor element comprises a fifth transistor having a gate node operatively connected to the first contact node of the storage element, a first contact node operatively connected to the first contact node of the sixth transistor and a second contact node operatively connected to the supply voltage and it comprises a sixth transistor having a second contact node operatively connected to the gate node of the third transistor.

Herewith the pixel sensor element can be switched on and off multiple times within one video frame period resulting in a reset of the light sensitive element and the generation of multiple video frame segments. Each video frame segment contains a desired small video signal package with a reduced noise signal, which image information is stored in the storage element until the complete read-out of the video frame takes place at the end of the video frame period.

For switching on and off the pixel sensor element multiple times the resetting circuitry comprises at least one pulse generating device having a first contact node operatively connected to at least the gate node of the second transistor and a second contact node connected to the gate node of the sixth transistor. This allows a subsequent resetting of the pixel sensor element for generating a subsequent video frame segment, which image information is accumulated in the storage element.

In order to allow an accumulation of the image information obtained with the subsequent video frame segments the storage element comprises at least one capacitor, in particular a MOS or a MIM capacitor. As a MOS capacitor is sensitive to light impinging on the pixel sensor element according to a further improvement it is covered for either front illuminated or back illuminated operation with a metal shielding layer.

Herewith it is avoided that any image information that is considered as an unwanted background noise signal can distort the desired image information.

Figure 2:
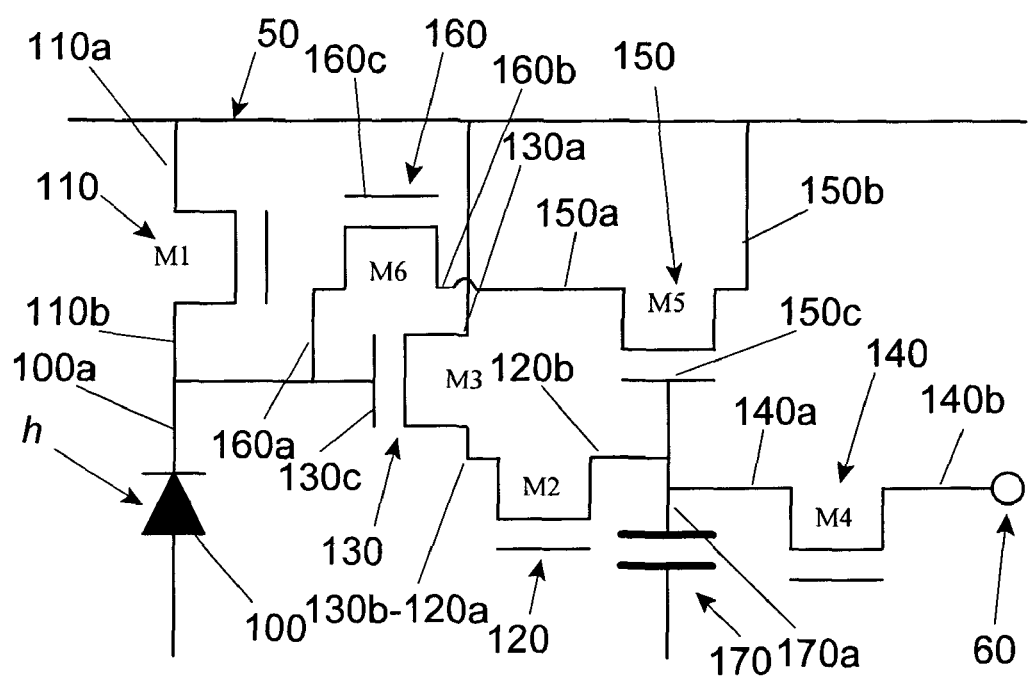

The invention will now be explained in detail using the accompanying drawings, which show in:

FIG. 1 an embodiment of a pixel sensor element according to the state of the art;

FIG. 2 an embodiment of a pixel sensor element according to the invention.

In FIG. 1 a pixel sensor element according to the state of the art is disclosed. Such pixel sensor element can be used in an image sensor array device and comprising a light sensitive element 10, for example a photo diode capable of generating and outputting via an output node 10a an electric signal in dependence of light impinging on said light sensitive element 10. In FIG. 1 said light is denoted with h. According to the state of the art the photodiode 10 converts impinging photons into an electric signal (voltage) used for generating a video frame containing image information.

The pixel sensor element according to the state of the art is reset using a reset circuitry, which is connected with all pixel sensor elements contained in the image sensor array device. At the moment of reset at the start of each video frame an external voltage is applied simultaneously to all pixel sensor elements connecting to the gate node of the first transistor 11 (M1). The transistor M1 is connected with a first contact node 11a to the supply voltage 5 and with a second contact node 11b to the output node 10a of the photosensitive element 10.

During the video frame period the photosensitive element 10 is exposed to light (photons h) impinging thereon, resulting in a decreasing voltage across the photosensitive element 10. After a pre-determined exposure time, corresponding to the video frame rate, the remaining voltage on the photosensitive element 10 is read-out via the second transistor 12 (M2). To this end a first contact node 12a of the second transistor 12, which is operatively connected with the output node 10a of the photosensitive element 10. A second contact node of the second transistor 12 is connected with the gate node 13c of a third transistor 13 (M3).

M3 amplifies the voltage signal from the photosensitive element 10 and applies this amplified voltage signal to a fourth transistor 14 (M4). A first contact node 14a of the fourth transistor 14 is thereto connected with a second contact node 13b of the third transistor 13. During the video frame period the fourth transistor 14 is in its "closed" state and will "open" at the end of the video frame period for outputting the amplified voltage signal via its second contact node 14b to an output node 6 of the pixel sensor element 1.

Normally the contact node 6 is connected to the column amplifiers of the pixel sensor array.

For each subsequent video frame period the light sensitive element needs to be reset to the supply voltage 5 by applying a reset signal to the gate node of transistor 11 (M1), said transistor being connected with both the first contact node 11a to the supply voltage 5 and with the second contact node 11b to the contact node 10a of the light sensitive element and the first contact node 12a of the second transistor 12 (M2).

A drawback of this known pixel sensor element 1 according to the state of the art is that during the exposure period of the photosensitive element 10 no distinction can be made between the actual desired image information and undesired image information. This latter undesired image information will adversely affect the signal to noise ratio. In fact during one video frame period the photosensitive element 10 is exposed to all light impinging thereon, including undesired light, hence all photons are collected and converted into an electric signal outputted at the contact node 10a.

One particular embodiment of the present invention allows the detection and storage in a solid state image sensor of multiple image frame segments of a short time duration being a fraction of the time duration corresponding to the video frame rate when an external control voltage is applied to the sensor (ON-state) while being insensitive to light when the control voltage is applied in another way (OFF-state). The embodiment allows for multiple ON-OFF sequences within one exposure frame of the image sensor. In this way, the high speed operation remains in the pixel sensor array while the read-out of the overall image at the end of the video frame duration can take place at realistic read-out speed. The embodiment consists of a pixel architecture made of six transistors as is depicted in FIG. 2.

The pixel sensor element 100 according to the invention and as disclosed in FIG. 2 allows for integrating an electric signal during one video frame period containing only or containing mostly image signal information which is desired and wherein unwanted image signal information removed to a maximum extent.

In FIG. 2 the pixel sensor element 100 is switched on and off multiple times within one video frame period using external synchronising signals applied to the pixel sensor element 100 via a reset circuitry connected to the gate nodes of transistors 120 (M2) and 160 (M4).

According to the invention the gate node 130c of the third transistor 130 (M3) is now directly operatively connected with the output node 100a of the light sensitive element 100. A first contact node 130a of the third transistor 130 is operatively connected to the supply voltage 50. A second contact node 130b is connected with a first contact node 120a of the second transistor 120 (M2).

According to the invention the second contact node 120b of the second transistor 120 (M2) is connected with the first contact node 140a of the fourth transistor 140 (M4).

In comparison with the state of the art embodiment as shown in FIG. 1, the pixel sensor element of FIG. 2 is provided with a storage element 170 having a first contact node 170a operatively connected with the second contact node 120b of the second transistor 120 and the first contact node 140a of the fourth transistor 140 and the gate node 150c of the fifth transistor 150 (M5).

According to the invention, to obtain the multiple resets of the pixel sensor element of FIG. 2 during one video frame period, the voltage signal outputted via the output node 100a of the photosensitive element 100 is collected and stored via the third and second transistor 130 respectively 120 in the storage element 170. The electric signal stored in the storage element 170 is used as the new reset voltage for the next reset of the light sensitive element 100 within the same video frame period.

To this end the pixel sensor element of FIG. 2 is provided with two additional transistors 150 and 160, which amplify the voltage signal stored in the storage element 170 and apply this signal to the light sensitive element 100 as the new reset voltage for generating the next subsequent video frame segment. Hereto a first contact node 150a of the fifth transistor 150 is operatively connected with the second contact node 160b of the sixth transistor 160 (M4). Likewise a second contact node 150b of the fifth transistor 150 is connected with the supply voltage 50. A first contact node 160a of the sixth transistor 160 is connected with the first contact node 100a of the photodiode 100.

During one video frame period the pixel sensor element 100 is reset multiple times via the application of external electrical signals connected to the gate nodes of transistors 120 (M2) and 160 (M4). Between each reset, which can be considered as a small period of time, for example 50 ns, image information is obtained with the light sensitive element 100 and outputted as a so called video frame segment information signal to the storage element 170 wherein it is stored.

At the end of the video frame period the fourth transistor 140 is opened and the complete video frame is read-out and outputted to the contact node 60 of the pixel sensor element.

The accumulation of multiple video frame segments (image information signal acquired between multiple reset times) before the read-out of the complete video frame information signal will result in an considerable increase of the signal to noise ratio. As the pixel sensor element is switched on and off multiple times during one video frame period any unwanted, parasitic image signal information will not be accumulated inside the storage element 170, which undesired image signal information is generated in the pixel sensor element during the periods of time that the pixel sensor element is switched off.

Hence according to the invention one single video image frame that is read out via the contact node 60 is built up from multiple gated images, that were obtained and generated by synchronisation with an external circuitry connected to the gate nodes of transistors 120 and 160.

With this construction the pixel sensor element according to the invention can be switched on and off using a switching voltage which is less by two or three decades than the voltage required to operate image intensifiers or electron bombarded active pixel sensors according to the state of the art.

The pixel sensor element according to the invention can be used for imaging photons directly into the photosensitive element 100 which is preferably manufactured from silicon and can operate within a wavelength range of 200 to 1100 nm. In another embodiment the photosensitive element 100 can be manufactured from InGaAs or from another III-V compound semiconducting material operating within a wavelength range of 700 to 1900 nm.

The pixel sensor element according to the invention can also be used in combination with an image intensifier providing an improved signal to noise ratio in situations having a low light intensity providing a spectral sensitivity, unequal to the nowadays available solid state image sensors. In an other embodiment the pixel sensor element according to the invention can be used in an electron bombarded image sensor array device.

In a further embodiment the storage element 170 can be constructed as a capacitor in particularly a MOS capacitor. As a MOS capacitor is sensitive to light, provisions are to be made by adding a light shielding layer avoiding any undesired and or parasitic disturbances during the periods that the pixel sensor element is switched off. Such light shielding layer can be deposited on any section of either surface of the pixel sensor array, corresponding to the operation mode of illumination of the image sensor array, said operation mode being either front or back side illuminated. Such light shielding layer can be a metal light shielding layer. Also a MIM capacitor (Metal Insulator Metal) can be used as the storage element.

The sensor pixel architecture disclosed can be used in a variety of gated imaging applications, like for example for imaging photons from a scene or other event directly into the solid state image sensor made in Si for use in the wavelength range from 200 to 1100 nm, either front or back illuminated or made in InGaAs or another III-V compound semiconductor for use in the wavelength range from 700 to 1900 nm. Especially eye-safe laser range gating at ~1500 nanometer is a likely candidate.

Secondly, a sensor made according to this architecture can also be combined with an image intensifier that provides extra signal gain in case of low illumination or low signal intensity or it offers a spectral sensitivity not available in the electronic sensor. In this case, the fast gating of the high voltage of the photocathode of the image intensifier is no longer required.

Thirdly, the sensor pixel architecture can be used in a so-called electron bombarded mode where the total electronic sensor is constructed as an electron bombarded active pixels sensor, a semiconductor image sensor with the solid state imager mounted in a vacuum enclosure. In such a device, photons coming from the scene are generating photo-electrons in a photocathode mounted opposite to the solid state sensor. The photo-electrons are subsequently accelerated towards the semiconductor image sensor using an applied electric field of typically 1500 Volts.

Due to the high kinetic energy after such acceleration, a charge of several hundreds of electrons is created in the solid state sensor for every incident high velocity photoelectron, thus adding gain to the signal. In conventional electron bombarded active pixels sensors, gating operation requires that a very high voltage must be very rapidly switched on and off. The new pixel architecture in this case no longer requires to gate at a high repetition rate the high operating voltage but does so at modest TTL level voltages.

Additionally, the parasitic remaining unwanted sensitivity for photons of a conventional electron bombarded active pixel sensor when the high voltage is gated off is avoided due to the fact that the novel pixel structure is not sensitive to photons when switched off.

The invention claimed is:

1. An image sensor array having multiple pixel sensor elements along the surface area of said image sensor, which multiple pixel sensor elements are arranged in building up and outputting at a specified video frame rate subsequent video frames corresponding to the image, wherein said multiple pixel sensor elements are arranged for generating one or more video frame segments, said segments each having a time duration being a fraction of the time equivalent to the video frame rate, and composing a single video frame from the multiple of said video frame segments,
wherein the multiple video frame segments are accumulated to compose a complete video frame signal before an actual image read-out.

2. The image sensor array according to claim 1, wherein said time duration of said video frame segments is determined by an external control signal that is applied to all or part of the pixel sensor elements of said image sensor array.

3. The image sensor array according to claim 2, wherein said control signal is applied to the image sensor array in synchronisation with an external event that is imaged onto said image sensor array.

4. The image sensor array according to claim 3, wherein said external event having characteristic image information contained in a time duration that is a fraction of the video frame rate of said image sensor array.

5. The image sensor array according to claim 1, wherein said image sensor array is coupled using optical means to an output face of an image intensifier device for amplifying an external event being imaged onto said image sensor array.

6. An electron bombarded image sensor array device comprising a vacuum chamber having a photocathode capable of releasing electrons into said vacuum chamber when exposed to light impinging from an image on said photocathode, electric field means for accelerating said released electrons from said photocathode towards an anode spaced apart from said photocathode in a facing relationship to receive an electron image from said photocathode, such that during use said accelerated electrons impinging on said anode create multiple electron-hole pairs near the surface of said anode, wherein said anode being constructed as an image sensor array as defined in claim 1.

7. A pixel sensor element for use in an image sensor array as defined in claim 1, said pixel sensor element comprising either a light sensitive element capable of generating and outputting an electric signal in dependence of light impinging on said light sensitive element or a charge collecting element capable of collecting any electron charge generated within the boundaries of the pixel sensor element, and comprising at least one storage element for storing a signal in the pixel sensor element, as well as a first transistor, a second transistor, a third transistor, a fourth transistor, a fifth transistor and a sixth transistor wherein the first transistor having a first contact node operatively connected to a supply voltage and a second contact node operatively connected to a contact node of said light sensitive element or said charge collecting element;
the second transistor having a first contact node operatively connected to a first contact node of the third transistor and a second contact node operatively connected to both the first contact node of the fourth transistor and said storage element;
the third transistor having a first contact node connected to the supply voltage and a second contact node connected to the first contact node of the second transistor and a gate node connected to the first contact node of said light sensitive element or said charge collecting element;
the fourth transistor having a first contact node operatively connected to the second contact node of the second transistor and a second contact node operatively connected to a contact node of the pixel sensor element;
said at least one storage element having a first contact node operatively connected to the second contact node of the second transistor element and the first contact node of the fourth transistor;
the fifth transistor having a gate node operatively connected to the first contact node of the storage element, a first contact node operatively connected to the first contact node of the sixth transistor and a second contact node operatively connected to the supply voltage;
the sixth transistor having a first contact node operatively connected to the first node of the fifth transistor and a second contact node operatively connected to the first contact node of said light sensitive element or said charge collecting element.

8. The pixel sensor element according to claim 7, wherein the gate nodes of the first, second and sixth transistor are each separately connected to separate contact nodes of a resetting circuitry for operating each of said transistors independently and the gate node of the fourth transistor is connected to the read circuitry of the image sensor array.

9. The pixel sensor element according to claim 7, wherein the storage element comprises at least one capacitor.

10. The pixel sensor element according to claim 9, wherein the storage element comprises a MOS capacitor.

11. The pixel sensor element according to claim 9, wherein the storage element comprises a MIM capacitor.

12. The pixel sensor element according to claim 9, wherein the storage element comprises a light shielding layer.

13. The pixel sensor element according to claim 10, wherein the storage element comprises a light shielding layer.

14. The pixel sensor element according to claim 11, wherein the storage element comprises a light shielding layer.

15. The image sensor array according to claim 1, wherein the multiple video frame segments are obtained by switching the multiple pixel sensor elements on and off multiple times within one video frame period.

16. The image sensor array according to claim 1, wherein the multiple video frame segments are generated within one video frame period.

17. The image sensor array according to claim 1, wherein each of the multiple video frame segments contains a video signal package, each video signal package containing a portion of an overall video frame image information.

18. A pixel sensor element for use in an image sensor array as defined in claim 1, said pixel sensor element comprising either a light sensitive element capable of generating and outputting an electric signal in dependence of light impinging on said light sensitive element or a charge collecting element capable of collecting any electron charge generated within the boundaries of the pixel sensor element.

19. The pixel sensor element according to claim 18, further comprising at least one storage element for storing a signal in the pixel sensor element, as well as a first transistor, a second transistor, a third transistor, a fourth transistor, a fifth transistor and a sixth transistor wherein the first transistor having a first contact node operatively connected to a supply voltage and a second contact node operatively connected to a contact node of said light sensitive element or said charge collecting element.

* * * * *